US012165157B2

(12) United States Patent
Bae et al.

(10) Patent No.: US 12,165,157 B2
(45) Date of Patent: Dec. 10, 2024

(54) GENUINE-PRODUCT CERTIFICATION CONTENT CREATION DEVICE AND INTEGRATED CERTIFICATION SYSTEM USING THE SAME

(71) Applicant: CK&B CO., LTD., Seoul (KR)

(72) Inventors: Ki Hyeok Bae, Seoul (KR); In Je Cho, Seoul (KR); Jae Seung Jeong, Seoul (KR)

(73) Assignee: CK&B CO., LTD., Seoul (KR)

( * ) Notice: Subject to any disclaimer, the term of this patent is extended or adjusted under 35 U.S.C. 154(b) by 934 days.

(21) Appl. No.: 17/081,025

(22) Filed: Oct. 27, 2020

(65) Prior Publication Data

US 2021/0150538 A1  May 20, 2021

(30) Foreign Application Priority Data

Nov. 15, 2019 (KR) ........................ 10-2019-0147051

(51) Int. Cl.
*G06Q 30/00* (2023.01)
*G06K 19/06* (2006.01)
(Continued)

(52) U.S. Cl.
CPC ..... *G06Q 30/018* (2013.01); *G06K 19/06046* (2013.01); *G06K 19/06056* (2013.01); *G06K 19/06131* (2013.01); *G06T 1/0028* (2013.01)

(58) Field of Classification Search
CPC .......... G06Q 30/018; G06K 19/06056; G06K 19/06131; G06K 19/06046;
(Continued)

(56) References Cited

U.S. PATENT DOCUMENTS 9,619,807 B2 * 4/2017 Park ................. G06K 19/06028
11,216,826 B2 * 1/2022 Kwak .................. G06Q 30/018
(Continued)

FOREIGN PATENT DOCUMENTS

CN         102663600 A      9/2012
CN         104424579 A      3/2015
(Continued)

OTHER PUBLICATIONS

Office action issued on Nov. 20, 2020 from Korean Patent Office in a counterpart Korean Patent Application No. 10-2019-0147051 (English translation is also submitted herewith.).
(Continued)

*Primary Examiner* — Hoa Q Pham
(74) *Attorney, Agent, or Firm* — The PL Law Group, PLLC (57) ABSTRACT

An integrated certification system is a system for performing integrated certification on products to which genuine-product certification labels are attached. The integrated certification system includes an integrated certification management server. The integrated certification management server includes a distribution management module configured to acquire distributor identification information and a distribution number of each of the products from each distributor and match the distribution number to an identification number assigned to a corresponding distributor and a genuine-product certification module configured to receive a genuine-product certification request including user-related information and an identification number extracted from each of the genuine-product certification labels from a user terminal and perform genuine-product certification according to the received genuine-product certification request.

4 Claims, 9 Drawing Sheets

(51) Int. Cl.
   *G06Q 30/018* (2023.01)
   *G06T 1/00* (2006.01)
(58) Field of Classification Search
   CPC ............ G06K 19/06037; G06K 7/1417; G06T 1/0028; G06T 1/0078; G06T 1/0071; G06T 2201/0051; G06T 2201/0063; H04N 21/8358; H04N 1/3232; H04N 1/32288; H04N 1/32245; H06N 1/32267
   USPC ........... 382/141, 100; 705/317, 67; 235/385; 713/156, 173, 175, 176
   See application file for complete search history.

(56) References Cited

U.S. PATENT DOCUMENTS

| | | | |
|---|---|---|---|
| 2006/0054682 A1 | 3/2006 | De La Huerga | |
| 2007/0180248 A1 | 8/2007 | Gorostidi | |
| 2012/0027207 A1* | 2/2012 | Lee | G06T 1/0028 380/205 |
| 2013/0103599 A1* | 4/2013 | Sgrazzutti | G06Q 30/018 705/317 |
| 2016/0267620 A1* | 9/2016 | Calhoon | G06T 1/0028 |
| 2016/0323107 A1* | 11/2016 | Bhogal | H04W 12/10 |
| 2016/0364826 A1 | 12/2016 | Wang et al. | |

FOREIGN PATENT DOCUMENTS

| | | |
|---|---|---|
| EP | 1 310 890 A2 | 5/2003 |
| EP | 1 310 890 A3 | 5/2003 |
| JP | 2015-114680 A | 6/2015 |
| KR | 10-2006-0119481 A | 11/2006 |
| KR | 10-0769215 B1 | 10/2007 |
| KR | 10-2018-0024566 A | 3/2018 |
| KR | 20180024566 A * | 3/2018 |
| KR | 10-2037606 B1 | 10/2019 |
| KR | 102192402 B1 * | 12/2020 |

OTHER PUBLICATIONS

Office action issued on Nov. 18, 2023 from China Patent Office in a counterpart China Patent Application No. 202010165754.8 (English translation is also submitted herewith.).

European Search Report for EP20204817.9 issued on Aug. 9, 2021 from European patent office in a counterpart European patent application.

Sviatoslav Voloshynovskiy et al., "Stochastic Approach to Content Adaptive Digital Image Watermarking", Jan. 2006, Information Hiding Lecture Notes in Computer Science, pp. 211-236, XP019048547, ISBN: 978-3-540-67182-4.

* cited by examiner

GENUINE-PRODUCT CERTIFICATION CONTENT CREATION DEVICE AND INTEGRATED CERTIFICATION SYSTEM USING THE SAME

CROSS-REFERENCE TO RELATED APPLICATION

This application claims priority to and the benefit of Korean Patent Application No. 10-2019-0147051, filed on Nov. 15, 2019, the disclosure of which is incorporated herein by reference in its entirety.

BACKGROUND

1. Field

Embodiments of the present disclosure relate to a genuine-product certification technique.

2. Discussion of Related Art

Recently, the widespread illegal distribution of counterfeit products causes big losses to manufacturing companies, and this affects an increasing number of users. Thus, a genuine-product certification technique for preventing counterfeit products and certifying genuine products has attracted attention. Conventionally, a product is marked as being genuine by attaching a barcode, a quick response (QR) code, or a hologram to the corresponding product. However, barcodes and QR codes have standard formats that are simple and open to the public, and thus anyone can easily counterfeit the codes, and holograms cannot be used by users to ascertain whether products are genuine. Also, a technique of monitoring distribution channels through which fake products are being distributed during a product distribution process is also required in addition to the genuine-product certification technique.

SUMMARY

Embodiments of the present disclosure are intended to provide a genuine-product certification content creation device capable of monitoring a distribution status of genuine products and fake products on a distributor basis, on a region basis, on a language basis, and on a user basis and an integrated certification system using the same.

According to an aspect of the present disclosure, there is a genuine-product certification content creation device including a product information registrator configured to register product-related information for products to which genuine-product certification labels are to be attached, an identification number generator configured to generate identification numbers of the products according to the number of registered products, a watermark signal generator configured to generate a watermark signal to be inserted into content of each of the genuine-product certification labels on the basis of the identification numbers, and a watermark signal inserter configured to insert the watermark signal into the content according to a predetermined insertion intensity to generate genuine-product certification content.

The product information registrator may generate serial numbers of the products equal in number to the identification numbers and may store the generated serial numbers mapped one-to-one to the identification numbers.

The watermark signal generator may convert each of the identification numbers into a spreading sequence pattern having a preset length and may generate a watermark signal by randomly shuffling coefficient values in the spreading sequence pattern using a preset indexing key.

The watermark signal inserter may divide the content into a plurality of blocks, calculate a local moment, which is complexity for a local area, for each block of the content, apply a noise visibility function (NVF) filter to each block of the content to calculate an NVF value for a corresponding block, and determine the insertion intensity on the basis of the calculated local moment and the calculated NVF value.

The watermark signal inserter may insert the watermark signal into each block of the content using the following equation:

$$I'_{n,m} = I_{n,m} + \text{LocalMoment}_{(n,m)} * \text{NVF}_{(n,m)} * SPSQ_{(n,m)} * PW_{(i,j)} \quad \text{[Equation]}$$

where:
$I'_{n,m}$ is content into which a watermark signal of a block having a size of n×m is inserted;
$I_{n,m}$ is original content having a block having a size of n×m;
$\text{LocalMoment}_{(n,m)}$ is a local moment value of a corresponding block;
$\text{NVF}_{(n,m)}$ is an NVF value of a corresponding block;
$SPSQ_{(n,m)}$ is a watermark value to be inserted into a corresponding block; and
PW(Pixel Weight)$_{(i,j)}$ is a weight of an (i,j)th pixel of a corresponding block and is a variation allowed for brightness of each pixel.

The genuine-product certification content may include an edge pattern provided at each corner of the content, and the edge pattern may include a center pattern provided outside a corresponding edge and spaced apart from the center of the content in a direction toward the corresponding edge, a first edge line pattern provided along an edge of the content in a first direction from the center pattern, and a second edge line pattern provided along an edge of the content in a second direction perpendicular to the first direction from the center pattern.

The first edge line pattern may include a first long pattern having a first length and spaced a preset reference distance from the center pattern; and a first short pattern having a second length smaller than the first length and spaced a preset reference distance from the first long pattern, and the second edge line pattern may include a second long pattern having the first length and spaced a preset reference distance from the center pattern; and a second short pattern having the second length and spaced a preset reference distance from the second long pattern.

According to an aspect of the present disclosure, there is an integrated certification system for performing integrated certification on products to which genuine-product certification labels are attached, the integrated certification system including an integrated certification management server, and the integrated certification management server including a distribution management module configured to acquire distributor identification information and a distribution number of each of the products from each distributor and match the distribution number to an identification number assigned to a corresponding distributor, and a genuine-product certification module configured to receive a genuine-product certification request including user-related information and an identification number extracted from each of the genuine-product certification labels from a user terminal and perform genuine-product certification according to the received genuine-product certification request.

The distribution management module may generate identification numbers for the products according to the number of registered products, allocate the generated identification numbers to one or more distributors according to the number of products to be distributed to each distributor, acquire distributor identification information and distribution numbers of the products when warehousing and releasing are performed by the corresponding distributor, extract identification numbers corresponding to the acquired distributor identification information, and store the extracted identification numbers matched one-to-one to the distribution numbers.

The integrated certification management server may further include a distribution status manager configured to extract a distribution number corresponding to the identification number included in the genuine-product certification request, extract distributor identification information corresponding to the extracted distribution number, and store a result of performing the genuine-product certification matched to the distributor identification information.

The user-related information may include one or more of user identification information, location information, and language information of the user terminal.

The integrated certification management server may further include a region status manager configured to extract location information of the user terminal included in the genuine-product certification request and configured to manage a genuine-product certification status of each region on the basis of the extracted location information.

The region status manager may generate a genuine-product region map for displaying, at preset time intervals, one or both of a location where a genuine product is detected in each region and the number of times the genuine product is detected; and a fake-product region map for displaying, at preset time intervals, one or both of a location where a fake product is detected in each region and the number of times the fake product is detected.

When the number of times a fake product is detected in a specific region during a preset period of time exceeds a preset number, the region status manager may set a corresponding region as a fake-product caution region and transmit a caution message.

When a specific identification number is detected in places having different location information at the same time or when a specific identification number is detected several times in a preset region at preset time intervals, the genuine-product certification module may perform fake-product processing on a corresponding identification number.

The integrated certification management server may further include a user status manager configured to extract the user identification information included in the genuine-product certification request and configured to manage a user-specific genuine-product certification status on the basis of the extracted user identification information.

The user status manager may ascertain preference of a corresponding product or whether a corresponding product is repeatedly purchased depending on the number of genuine-product certification requests of a user for the same product group and may ascertain a corresponding user's product purchase pattern and product purchase period on the basis of time information of the genuine-product certification request of the user.

The integrated certification management server may further include a language status manager configured to extract the language information included in the genuine-product certification request and configured to manage a language-specific genuine-product certification status on the basis of the extracted language information.

The user-related information may include one or more of user identification information, location information, and language information of the user terminal, and the integrated certification system may further include a distribution status manager configured to extract a distribution number corresponding to the identification number included in the genuine-product certification request, extract distributor identification information corresponding to the extracted distribution number, and store a result of performing the genuine-product certification while the result is matched to the distributor identification information, a region status manager configured to extract the location information of the user terminal included in the genuine-product certification request and manage a region-specific genuine-product certification status on the basis of the extracted location information, a user status manager configured to extract the user identification information included in the genuine-product certification request and manage a user-specific genuine-product certification status on the basis of the extracted user identification information, and a language status manager configured to extract the language information included in the genuine-product certification request and manage a language-specific genuine-product certification status on the basis of the extracted language information.

The integrated certification system may further include a user terminal, and the user terminal may include a content image acquirer configured to capture the genuine-product certification label attached to the product and acquire a genuine-product certification content image, a watermark extractor configured to extract a watermark signal from the genuine-product certification content image, an identification number extractor configured to extract an identification number assigned to the product from the extracted watermark signal, a user-related information acquirer configured to acquire preset user-related information when a genuine-product certification event occurs in the user terminal, and a communicator configured to transmit a genuine-product certification request including the extracted identification number and the acquired user-related information to the integrated certification management server.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION

Hereinafter, exemplary embodiments of the present disclosure will be described with reference to the accompanying drawings. The following detailed description is provided to assist the reader in gaining a comprehensive understanding of methods, apparatuses, and/or systems described herein. However, this is merely an example, and the present disclosure is not limited thereto.

In describing embodiments of the present disclosure, when it is determined that a detailed description of a known technique associated with the present disclosure would unnecessarily obscure the subject matter of the present disclosure, the detailed description will be omitted. Also, terms used herein are defined in consideration of functions used in the present disclosure and may be changed depending on a user, the intent of an operator, or a custom. Therefore, the definitions should be made based on the contents throughout the specification. The terminology used herein is only for the purpose of describing embodiments of the present disclosure and should not be limiting. The singular forms "a," "an," and "the" are intended to include the plural forms as well, unless the context clearly indicates otherwise. It should be understood that the terms "comprises," "comprising," "includes," and/or "including" specify the presence of stated features, integers, steps, operations, elements, components, and/or groups thereof when used herein but do not preclude the presence or addition of one or more other features, integers, steps, operations, elements, components, and/or groups thereof.

In the following description, the terms "transfer," "communication," "transmission," "reception," or the like indicate that a signal or information is conveyed from one element to another element directly or through intervening elements. In particular, when a signal or information is referred to as being "transferred" or "transmitted" to one element, the element indicates a final destination rather than a direct destination. This may also be applied to a case in which the signal or information is "received." In the present specification, when two or more pieces of data or information are referred to as being "associated" with one another, this indicates that, if a piece of data (or information) is acquired, at least some other pieces of data (or information) may be acquired based on the association.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the scope of exemplary embodiments of the present disclosure.

Figure 1:
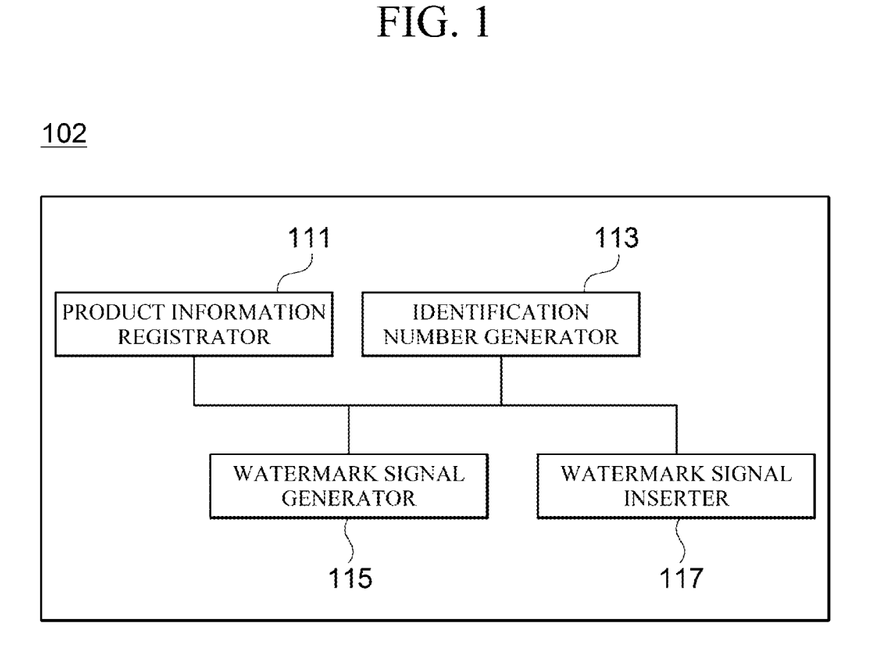
FIG. 1 is a diagram showing a configuration of a genuine-product certification content creation device according to an embodiment disclosed herein.

FIG. 1 is a diagram showing a configuration of a genuine-product certification content creation device according to an embodiment disclosed herein.

Referring to FIG. 1, the genuine-product certification content creation device 102 may include a product information registrator 111, an identification number generator 113, a watermark signal generator 115, and a watermark signal inserter 117.

The genuine-product certification content creation device 102 may create genuine-product certification content for generating a genuine-product certification label. The genuine-product certification content may be content into which a product identification number is inserted in the form of a watermark. Also, the genuine-product certification label may be produced in the form of a sticker detachable from a product. In an exemplary embodiment, the genuine-product certification label may be produced by printing genuine-product certification content on a base.

The product information registrator 111 may register information related to a product to which a genuine-product certification label is to be attached. The product-related information may include, for example, a product manufacturer, an order number, the number of products (i.e., the number of identification numbers), the version of the genuine-product certification label, a product-specific serial number, etc.

The product information registrator 111 may generate product-specific serial numbers equal in number to the identification numbers and may store the generated product-specific serial numbers mapped one-to-one to the identification numbers generated by the identification number generator 113. Here, a product-specific serial number may be for identifying a corresponding product in a webpage (e.g., a landing page) through which a user provides a genuine-product certification service.

That is, since an identification number is inserted into genuine-product certification content in a form that cannot be discerned by human eyes, the product information registrator 111 may generate a product-specific serial number so that a user can ascertain information about a product purchased by the user, and may store the product-specific serial number mapped to the identification number.

Also, the product information registrator 111 may perform registration such that a genuine-product certification webpage is linked to each identification number generated by the identification number generator 113. Thus, when an identification number is detected through a user terminal, the user terminal may access the genuine-product certification webpage.

The identification number generator 113 may generate identification numbers according to the number of registered products (i.e., the number of identification numbers). That is, the identification number generator 113 may generate unique identification numbers equal in number to the registered products.

For each identification number, the watermark signal generator 115 may generate a watermark signal to be inserted into content attached to a product on the basis of a corresponding identification number. Here, the content may be text, an image, or a combination of both. In an exemplary embodiment, the content may be a logo or a trademark of a product manufacturer or a product distributor, but the present disclosure is not limited thereto.

In detail, the watermark signal generator 115 may convert each identification number into a spreading sequence pattern having a predetermined length (e.g., 64 bits). Here, the spreading sequence may refer to a sequence in which coefficient values 1 and −1 are arranged to a preset length.

Also, the watermark signal generator 115 may randomly shuffle the coefficient values in the spreading sequence by using a preset indexing key. The watermark signal generator 115 may match each identification number to a corresponding spreading sequence and indexing key and may store the matching result in the form of a lookup table.

The watermark signal inserter 117 may determine an insertion intensity at which the watermark signal (i.e., the spreading sequence) generated by the watermark signal generator 115 is to be inserted into the content. The watermark signal inserter 117 may insert a watermark signal into content according to the determined insertion intensity.

In detail, the watermark signal inserter 117 may divide the content into a plurality of blocks. Here, for convenience of description, the following description assumes that the content is an image. The watermark signal inserter 117 may determine the insertion intensity of the watermark signal on the basis of the noise visibility function (NVF) and local moment (i.e., standard deviation) of a corresponding block.

The watermark signal inserter 117 may calculate a local moment, which is complexity for a local area, for each block of the content. Also, the watermark signal inserter 117 may calculate the NVF of the corresponding block by applying an NVF filter to each block of the content. The watermark signal inserter 117 may insert a watermark signal into each block of the content according to Equation 1 below:

$$I'_{n,m} = I_{n,m} + \text{LocalMoment}_{(n,m)} * \text{NVF}_{(n,m)} * SPSQ_{(n,m)} * PW_{(i,j)} \quad [\text{Equation 1}]$$

where $I'_{n,m}$ is content into which a watermark signal of a block having a size of n×m is inserted, $I_{n,m}$ is original content of a block having a size of n×m, $\text{LocalMoment}_{(n,m)}$ is a local moment value of a corresponding block, $\text{NVF}_{(n, m)}$ is the NVF of a corresponding block, $SPSQ_{(n, m)}$ is a spreading sequence (i.e., a watermark signal) to be inserted into a corresponding block, and $PW(\text{Pixel Weight})_{(i,j)}$ is the weight of an (i,j)th pixel of a corresponding block and indicates a variation allowed for brightness of each pixel. For example, PW (i, j) may be a value between 1 and 10.

The genuine-product certification content creation device 102 may transmit content, into which a watermark signal for genuine-product certification is inserted, to a label manufacturing device (not shown). The genuine-product certification content may be manufactured in the form of a label (sticker) through the label manufacturing device (not shown). In this case, genuine-product certification labels are released while attached to products.

Figure 2A:
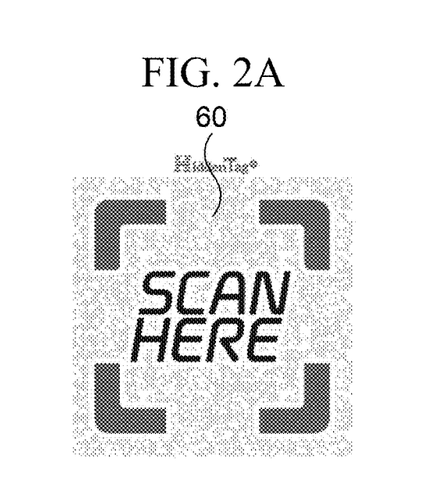
FIGS. 2A to 2C are diagrams showing various versions of genuine-product certification content according to an embodiment disclosed herein.
Figure 2B:
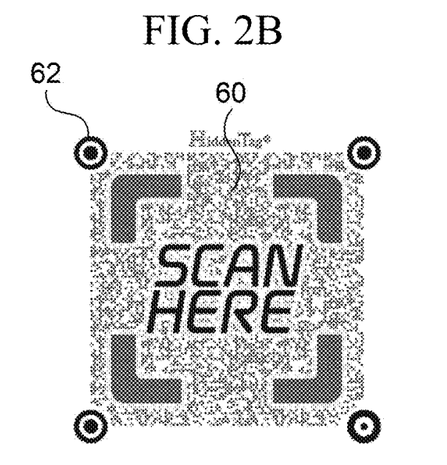
Figure 2C:
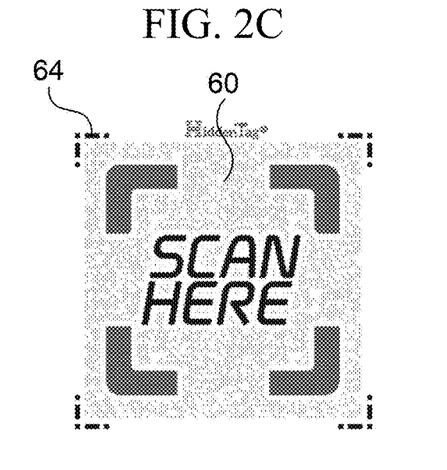

Meanwhile, the genuine-product certification content creation device 102 may create various versions of genuine-product certification content as shown in FIGS. 2A to 2C. FIG. 2A shows a first version of genuine-product certification content, which is formed by invisibly inserting a watermark signal into content 60 made of an image. FIG. 2B shows a second version of genuine-product certification content, which is formed by invisibly inserting a watermark signal into content 60 made of an image and providing a sync pattern 62 at each corner of the content 60. FIG. 2C shows a third version of genuine-product certification content, which is formed by invisibly inserting a watermark signal into content 60 made of an image and providing an edge pattern 64 at each corner of the content 60.

Here, the sync pattern 62 and the edge pattern 64 are for easily extracting watermark signals in their original forms when the watermark signals are extracted by scanning or photographing genuine-product certification content through a user terminal. The genuine-product certification content creation device 102 may generate a sync pattern 62 or an edge pattern 64 and insert the sync pattern 62 or the edge pattern 64 into content 60 when genuine-product certification content is generated.

Figure 3:
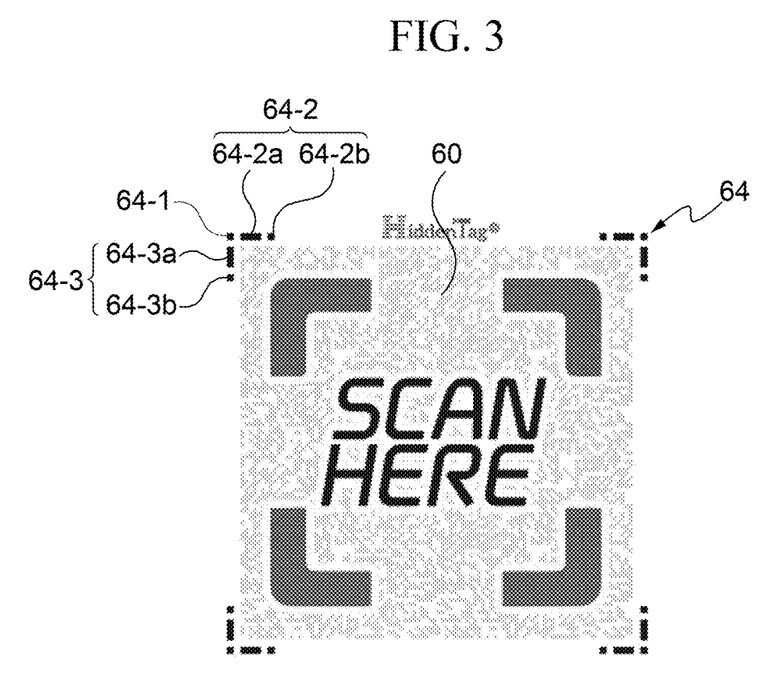
FIG. 3 is a diagram showing genuine-product certification content to which an edge pattern is applied according to an embodiment disclosed herein.

FIG. 3 is a diagram showing genuine-product certification content to which an edge pattern is applied according to an embodiment disclosed herein. Referring to FIG. 3, the edge pattern 64 may be provided at each corner of the content 60. The edge pattern 64 may include a center pattern 64-1, a first edge line pattern 64-2, and a second edge line pattern 64-3.

The center pattern 64-1 may be spaced from the outside of each corner of the content 60. The center pattern 64-1 may be spaced from the outside of a corresponding corner in a direction from the center of the content 60 to the corner. In an exemplary embodiment, the center pattern 64-1 may be formed in a square shape, but the present disclosure is not limited thereto. The center pattern 64-1 may be a black pattern.

The first edge line pattern 64-2 may be provided in a first direction (e.g., a lateral direction) from the center pattern 64-1. The first edge line pattern 64-2 may include a first long pattern 64-2a and a first short pattern 64-2b. The first long pattern 64-2a and the first short pattern 64-2b may be arranged in a row in the first direction from the center pattern 64-1.

The first long pattern 64-2a may be spaced a certain distance from the center pattern 64-1. The first long pattern 64-2a may be spaced a preset reference distance (e.g., the width (or the diameter) of the center pattern 64-1) from the center pattern 64-1. The first long pattern 64-2a may be provided as a black pattern having a first length. A space between the center pattern 64-1 and the first long pattern 64-2a may be white.

The first short pattern 64-2b may be spaced a certain distance from the first long pattern 64-2a. The first short pattern 64-2b may be spaced a preset reference distance (e.g., the width (or the diameter) of the center pattern 64-1) from the first long pattern 64-2a. The first short pattern 64-2b may be provided as a black pattern having a second length smaller than the first length. The first short pattern 64-2b may have a size and shape corresponding to those of the center pattern 64-1. A space between the first long pattern 64-2a and the first short pattern 64-2b may be white.

The second edge line pattern 64-3 may be provided in a second direction (e.g., a longitudinal direction) perpendicular to the first direction from the center pattern 64-1. The second edge line pattern 64-3 may include a second long pattern 64-3a and a second short pattern 64-3b. The second long pattern 64-3a and the second short to pattern 64-3b are the same as the first long pattern 64-2a and the first short pattern 64-2b, and thus a detailed description thereof will be omitted.

By providing the edge pattern 64 at each corner of the content 60, the edge pattern 64 may be easily detected through a user terminal (not shown), and also a watermark signal may be easily detected from the content in the edge pattern 64.

Figure 4:
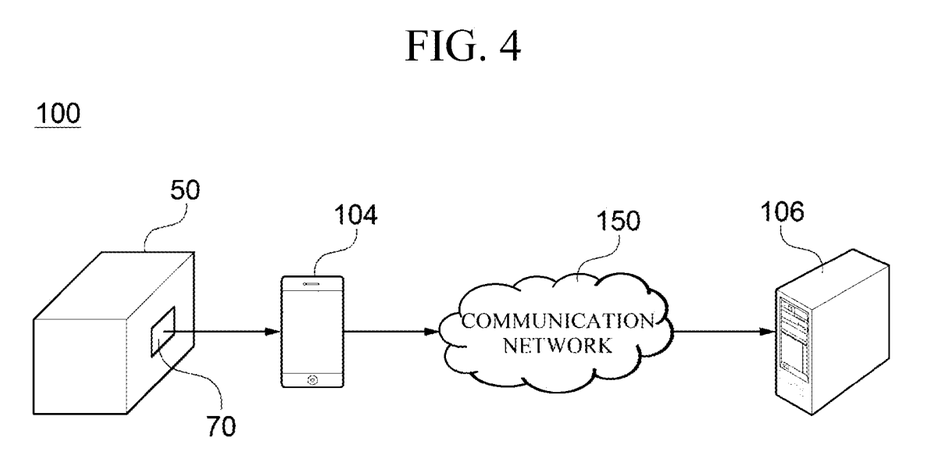
FIG. 4 is a diagram showing a configuration of an integrated certification system according to an embodiment disclosed herein.

FIG. 4 is a diagram showing a configuration of an integrated certification system according to an embodiment disclosed herein.

Referring to FIG. 4, the integrated certification system 100 may include a user terminal 104 and an integrated certification management server 106.

The user terminal 104 is communicably connected to the integrated certification management server 106 through a communication network 150. In some embodiments, the communication network 150 may include the Internet, one or more local area networks, wide area networks, a cellular network, a mobile network, other types of networks, or combinations thereof.

The user terminal 104 may be a terminal of a user who purchases a product 50. For example, the user terminal 104 may be a smart device such as a smartphone or a tablet PC. The user may ascertain whether the purchased product 50 is certified as a genuine product using the user terminal 104. A genuine-product certification label 70 produced using the genuine-product certification content may be attached to the product 50.

Figure 5:
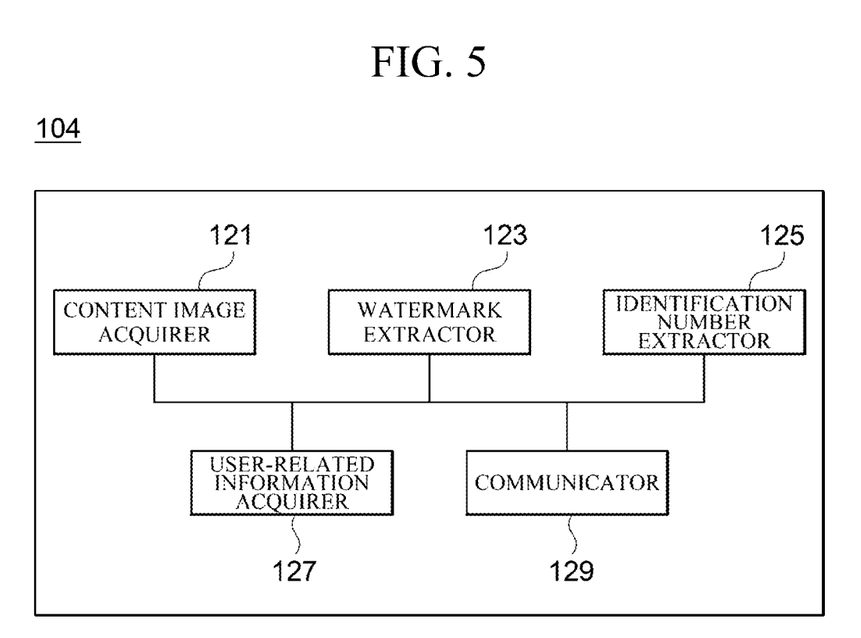
FIG. 5 is a block diagram showing a configuration of a user terminal according to an embodiment of the present disclosure.

FIG. 5 is a block diagram showing a configuration of the user terminal 104 according to an embodiment of the present disclosure. Referring to FIG. 5, the user terminal 104 may include a content image acquirer 121, a watermark extractor 123, an identification number extractor 125, a user-related information acquirer 127, and a communicator 129.

The content image acquirer 121 may capture the genuine-product certification label 70 attached to the product 50 to acquire a genuine-product certification content image. The content image acquirer 121 may include a camera or a scanner.

The watermark extractor 123 may extract a watermark signal from the genuine-product certification content image. In detail, the watermark extractor 123 may detect a sync pattern 62 or an edge pattern 64 according to the version type of the genuine-product certification content and may correct the acquired genuine-product certification content image using a projection matrix for correcting the detected sync pattern 62 or edge pattern 64 to place the pattern at predetermined positions. The watermark extractor 123 may extract a watermark signal from the genuine-product certification content image.

The identification number extractor 125 may extract an identification number from the extracted watermark signal. In detail, the identification number extractor 125 may inversely index the extracted watermark signal (i.e., a spreading sequence). That is, the spreading sequence is indexed by randomly shuffling coefficient values upon the creation of the genuine-product certification content. Thus, by inversely indexing the spreading sequence, an original spreading sequence may be calculated. The identification number extractor 125 may extract an identification number from the inversely-indexed spreading sequence. For example, the identification number extractor 125 may extract the identification number corresponding to the inversely-indexed spreading sequence from prestored identification numbers. However, the present disclosure is not limited thereto, and an algorithm for converting the identification number into the spreading sequence may be used in reverse.

The user-related information acquirer 127 may acquire preset user-related information when a genuine-product certification event occurs in the user terminal 104. Here, the genuine-product certification event may occur in connection with the acquisition of the genuine-product certification content image. In detail, the user-related information acquirer 127 may acquire location information of the user terminal 104 upon the occurrence of the genuine-product certification event. In an exemplary embodiment, the user-related information acquirer 127 may acquire global positioning system (GPS) information from a GPS module installed in the user terminal 104.

Also, the user-related information acquirer 127 may acquire user identification information (e.g., a user universal unique identifier (UUID)). In an exemplary embodiment, the user-related information acquirer 127 may extract the identification (ID) of an application for genuine-product certification installed in the user terminal 104 (hereinafter referred to as a genuine-product certification application) and may acquire the extracted ID of the genuine-product certification application as the UUID.

That is, a genuine-product certification application for providing a genuine-product certification service according to an embodiment disclosed herein to a user may be installed in the user terminal 104. The genuine-product certification application may be stored in a computer-readable storage medium of the user terminal 104. The genuine-product certification application may include a predetermined set of instructions executable by a processor of the user terminal 104. The instructions may cause the processor of the user terminal 104 to perform an operation according to an exemplary embodiment. The computer-readable storage medium of the user terminal 104 includes components of an operating system for executing a set of instructions such as the genuine-product certification application on the user terminal 104. For example, the operating system may be either Apple's iOS or Google's Android.

Also, the user-related information acquirer 127 may acquire user language information. In an exemplary embodiment, language information set by the user may be extracted from the genuine-product certification application, and the extracted language information may be acquired as the user language information.

The communicator 129 may perform communication with the integrated certification management server 106. The communicator 129 may transmit a genuine-product certification request including an identification number and user-related information to the integrated certification management server 106. The communicator 129 may receive a genuine-product certification result for the genuine-product certification request from the integrated certification management server 106.

Meanwhile, a scratch layer may be formed on one region of a surface of the genuine-product certification label 70. In this case, the scratch layer may be formed to cover a certification key. That is, the user may ascertain the certification key after removing the scratch layer from the genuine-product certification label 70. The user may transmit the certification key to the integrated certification management server 106 through the user terminal 104 to perform user registration.

The integrated certification management server 106 may manage an individual distribution history of each product on a distributor basis. Also, the integrated certification management server 106 may perform genuine-product certification according to the genuine-product certification request of the user terminal 104. Also, the integrated certification management server 106 may statically process a result of performing the genuine-product certification.

Figure 6:
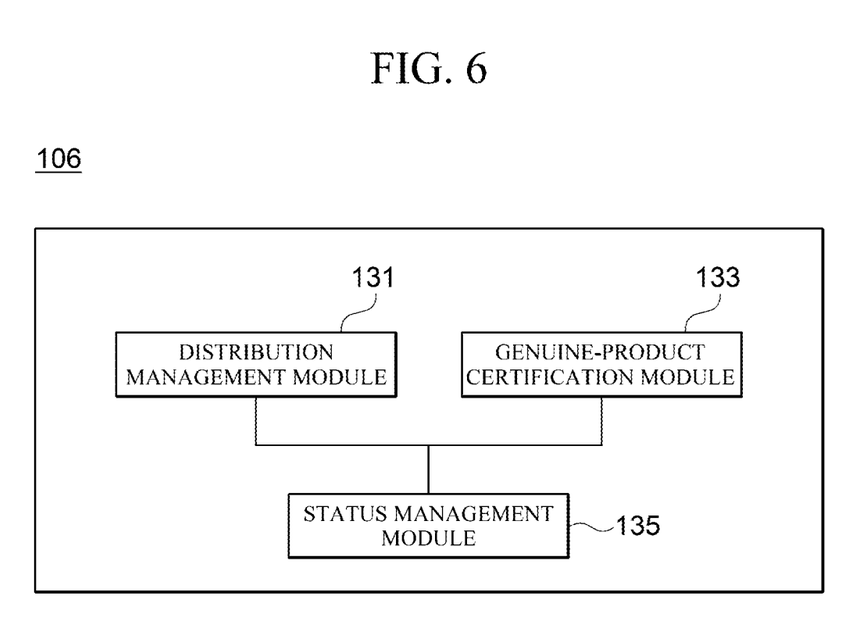
FIG. 6 is a block diagram showing a configuration of an integrated certification management server according to an embodiment disclosed herein.

FIG. 6 is a block diagram showing a configuration of the integrated certification management server 106 according to an embodiment disclosed herein. Referring to FIG. 6, the integrated certification management server 106 may include a distribution management module 131, a genuine-product certification module 133, and a status management module 135.

The distribution management module 131 is for managing an individual distribution history of each product on a distributor basis. In detail, the distribution management module 131 may acquire a distribution number of each product from a scanner device (not shown) of each distributor. The distribution management module 131 may store the distribution number matched to any one identification numbers allocated to the corresponding distributor.

For example, when a product manufacturer manufactures 10,000 products named "A," the number of identification numbers of the products named "A" is 10,000 (e.g., numbered from 1 to 10,000). Here, the following description assumes that identification numbers 1 to 1,000 are assigned to and distributed by a distributor named "a," identification numbers 1,001 to 5,000 are assigned to and distributed by a distributor named "b," and identification numbers 5,001 to 10,000 are assigned to and distributed by a distributor named "c."

Then, each distributor performs warehousing and shipping by allocating a distribution number to each product to be distributed. That is, each distributor manages warehousing and shipping by allocating distribution numbers to products that are assigned to the corresponding distributor separately from identification numbers.

When a distributor warehouses each product, an administrator performs warehousing management by scanning a QR code, a barcode, a data matrix, and the like attached to a product through a scanner device such as a handheld scanner to obtain a distribution number allocated to the corresponding product. In this case, the distribution management module 131 may acquire a distribution number and distributor identification information from a scanner device of each distributor.

The distribution management module 131 may extract identification numbers assigned to a corresponding distributor on the basis of distributor identification information. For example, when the corresponding distributor is a distributor named "a," the distribution management module 131 may acquire 1,000 distribution numbers and extract identification numbers 1 to 1,000 assigned to the corresponding distributor. The distribution management module 131 may store the identification numbers 1 to 1,000 matched one-to-one to the 1,000 distribution numbers.

Meanwhile, the distribution management module 131 may acquire a distribution number from the scanner device of each distributor even when each of the products is shipped. In this case, each distributor may manage the warehousing and shipping of the products in association with the identification numbers. That is, the identification number of each product matched to the distributor identification information and the distribution number of a corresponding distributor is stored. Thus, when the distribution number is acquired upon the warehousing and releasing, the distributor may manage a warehousing and shipping history on the basis of the identification numbers of the products.

When the genuine-product certification module 133 receives a genuine-product certification request from the user terminal 104, genuine-product certification may be performed on the basis of user-related information and an identification number included in the genuine-product certification request. In detail, the genuine-product certification module 133 may ascertain whether the prestored identification to numbers include an identification number that is the same as the identification number included in the genuine-product certification request.

When the prestored identification numbers include the identification number that is the same as the identification number included in the genuine-product certification request and the corresponding identification number is detected first, the genuine-product certification module 133 may determine that the product corresponding to the genuine-product certification request is a genuine product.

When the prestored identification numbers do not include the identification number that is the same as the identification number included in the genuine-product certification request or when the corresponding identification number is not detected first although the prestored identification numbers include the same identification number, the genuine-product certification module 133 may determine that the product corresponding to the genuine-product certification request is a fake product.

When a specific identification number is detected in places having different location information at the same time or when a specific identification number is detected several times in a preset region at preset time intervals, the genuine-product certification module 133 may perform fake-product processing on the corresponding identification number.

The genuine-product certification module 133 may store a result of performing the genuine-product certification. When the result of performing the genuine-product certification is that the product is determined to be genuine, the genuine-product certification module 133 may perform genuine product registration on the corresponding identification number and the corresponding user identification information. When the result of performing the genuine-product certification is that the product is determined to be fake, the genuine-product certification module 133 may perform fake product registration on the corresponding identification number and the corresponding user identification information. The genuine-product certification module 133 may transmit the result of performing genuine-product certification to the user terminal 104.

Figure 7:
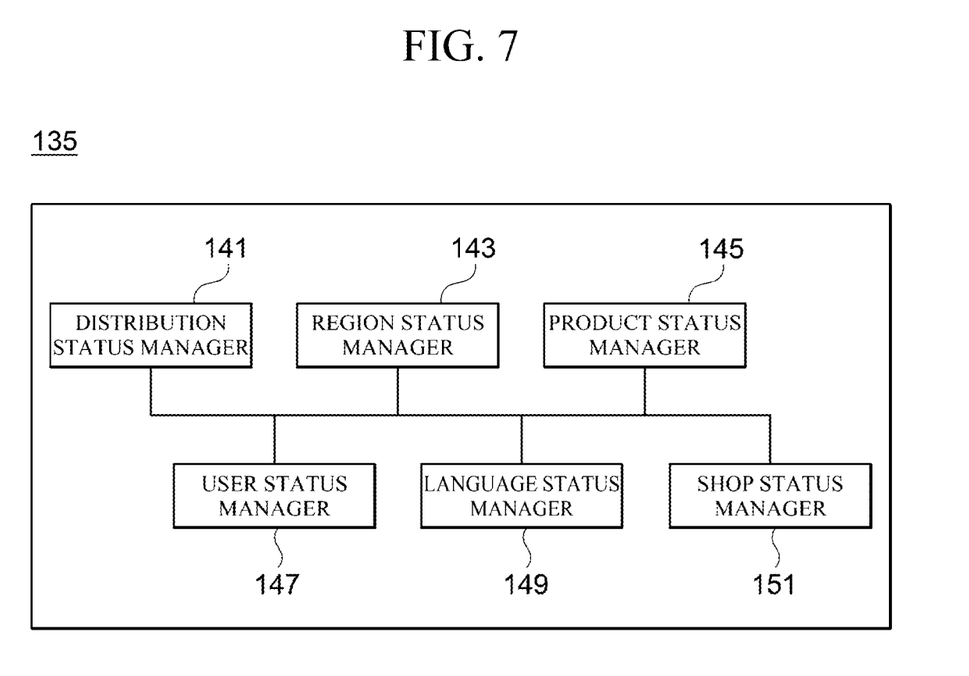
FIG. 7 is a block diagram showing a configuration of a status management module according to an embodiment disclosed herein.

The status management module 135 may perform genuine-product-certification-related monitoring on the basis of the genuine-product certification request and the corresponding result of performing the genuine-product certification. FIG. 7 is a block diagram showing a configuration of the status management module 135 according to an embodiment disclosed herein. Referring to FIG. 7, the status management module 135 may include a distribution status manager 141, a region status manager 143, a product status manager 145, a user status manager 147, a language status manager 149, and a shop status manager 151.

Also, in an embodiment, the distribution status manager 141, the region status manager 143, the product status manager 145, the user status manager 147, and the language status manager 149 are implemented using one or more physically separated apparatuses or by one or more processors or a combination of software and one or more processors. Unlike the illustrated example, the distribution status manager 141, the region status manager 143, the product status manager 145, the user status manager 147, and the language status manager 149 may not be clearly distinguished in a specific operation.

The distribution status manager 141 may manage a distributor-specific genuine-product certification status. That is, the distribution status manager 141 may extract a distribution number corresponding to the identification number included in the genuine-product certification request. The distribution status manager 141 may store the result of performing the genuine-product certification that corresponds to the genuine-product certification request and that is matched to the distributor identification information corresponding to the distribution number. In this case, for each distributor, the distribution status manager 141 may ascertain the number of detections of genuine products and the number of detections of fake products relative to the number of genuine-product certification requests.

The region status manager 143 may manage a region-specific genuine-product certification status. The region status manager 143 may extract user location information upon the genuine-product certification request from the user-related information included in the genuine-product certification request. The region status manager 143 may manage a genuine-product certification status for each region on the basis of the extracted location information. That is, for each region, the region status manager 143 may ascertain the number of detections of genuine products and the number of detections of fake products.

Also, the region status manager 143 may generate a map for a genuine product detection region (a genuine product region map) on a period basis. That is, the region status manager 143 may generate the genuine product region map by displaying, at specific time intervals, one or both of a location where a genuine product is detected in each region and the number of times the genuine product is detected. The region status manager 143 may generate a map for a fake product detection region (a fake product region map) on a period basis. That is, the region status manager 143 may generate the fake product region map by displaying, at specific time intervals, one or both of a location where a fake product is detected in each region and the number of times the fake product is detected.

Figure 8:
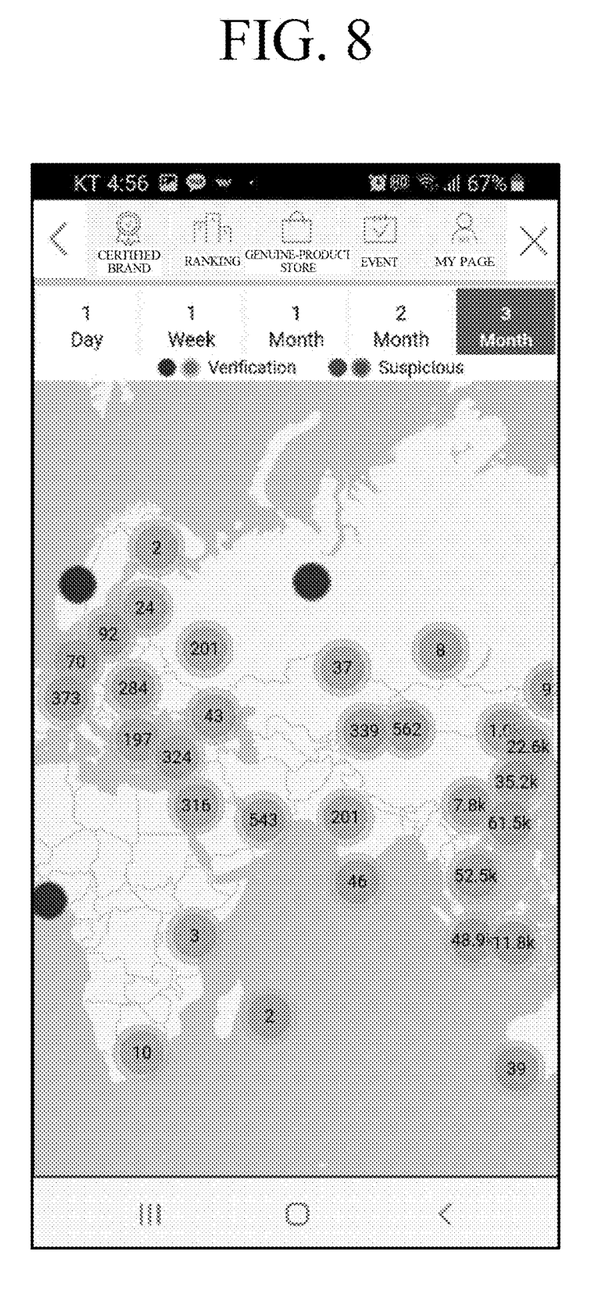
FIG. 8 is a diagram showing a map of genuine products and fake products for each country according to an embodiment disclosed herein.
Figure 9:
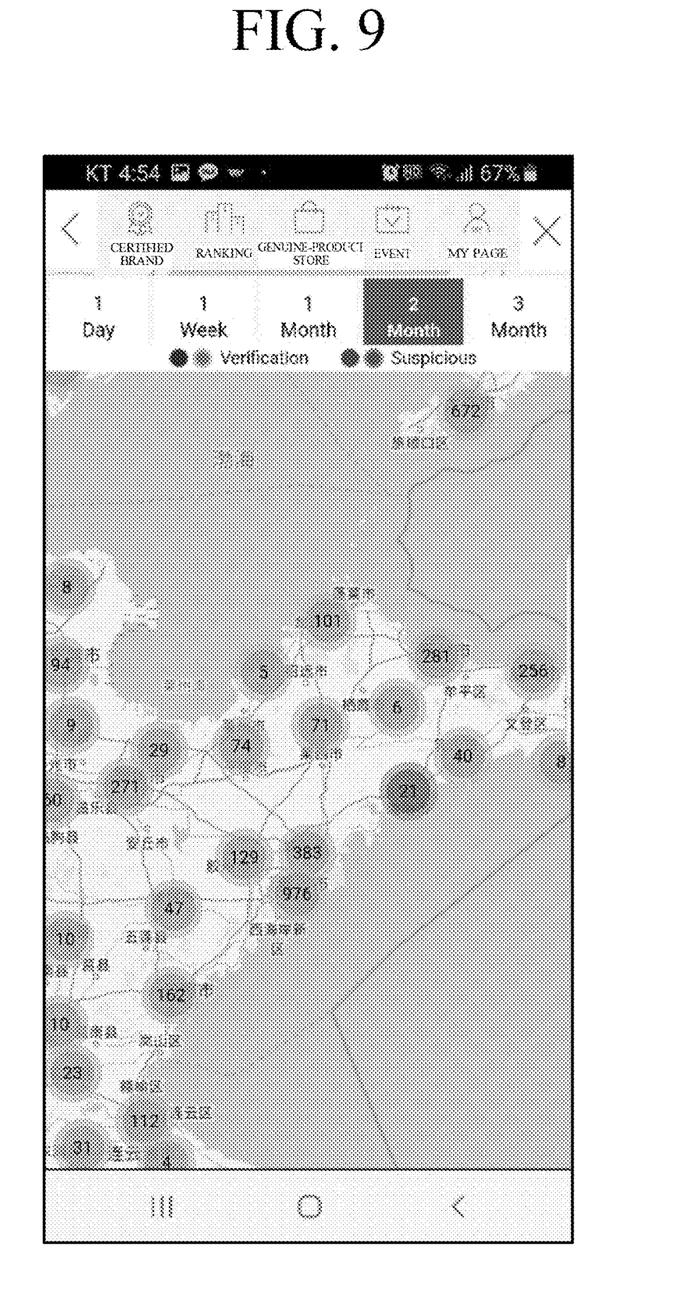
FIG. 9 is a diagram showing a map of genuine products and fake products for each region in a country according to an embodiment disclosed herein.

As shown in FIG. 8, the region status manager 143 may display the number of times a genuine product is detected and the number of times a fake product is detected on a country basis at certain time intervals. Also, as shown in FIG. 9, the region status manager 143 may display the number of times a genuine product is detected and the number of times a fake product is detected at certain time intervals by region of a country.

When the number of times fake products are detected in a specific region during a preset period of time exceeds a preset number, the region status manager 143 may set a corresponding region as a fake-product caution region and transmit a caution message to users of a corresponding product.

The product status manager 145 may manage a product-specific genuine-product certification status. For each product, the product status manager 145 may monitor the number of times the corresponding product is found to be genuine and the number of times the corresponding product is found to be fake. The product status manager 145 may generate product-specific genuine-product certification ranks at certain time intervals. For example, the product status manager 145 may determine product ranks in descending order of the number of detections of genuine products or the number of detections of fake products during a certain period of time. Also, the product status manager 145 may determine product ranks in ascending order of the number of detections of fake products relative to the number of detections of genuine products during a certain period of time.

The product status manager 145 may generate manufacturer-specific genuine-product certification ranks on the basis of the product-specific ranks. That is, the product status manager 145 may determine the manufacturer genuine-product certification ranks in ascending order of the number of detections of fake products relative to the number of detections of genuine products during a certain period of time. In this case, users may safely select (or purchase) a manufacturer (or a product) having a high genuine-product certification rank. That is, by providing the genuine-product certification ranks to a user, the user may be allowed to select or purchase a product or a manufacturer having a small number of fake products.

The user status manager 147 may manage a user-specific genuine-product certification status. The user status manager 147 may extract user identification information (e.g., UUID, etc.) from the user-related information included in the genuine-product certification request. The user status manager 147 may manage a user-specific genuine-product certification status on the basis of the extracted user identification information. That is, for each user, the user status manager 147 may ascertain the number of detections of genuine products and the number of detections of fake products. The user status manager 147 may generate user-specific genuine-product certification ranks. For example, the user status manager 147 may determine user ranks in descending order of the number of detections of genuine products or the number of detections of fake products during a certain period of time.

The user status manager 147 may monitor user purchase patterns on the basis of genuine-product certification requests from the user. For example, the user status manager 147 may ascertain the preference of a corresponding product or whether a corresponding product is repeatedly purchased depending on the number of genuine-product certification requests of users for the same product group (the number of times the product is determined to be genuine). Also, the user status manager 147 may ascertain the users' product purchase patterns, product purchase periods, and the like on the basis of time information of the genuine-product certification requests of the users.

The language status manager 149 may manage a language-specific genuine-product certification status. The language status manager 149 may extract language information from the user-related information included in the genuine-product certification request. The language status manager 149 may manage a language-specific genuine-product certification status on the basis of the extracted language information. For each language, the language status manager 149 may ascertain the number of detections of genuine products and the number of detections of fake products. The language status manager 149 may generate genuine-product certification ranks for the products on a language basis.

The shop status manager 151 may manage a shop-specific certification status. The shop status manager 151 may extract the identification number included in the genuine-product certification request, extract a distribution number corresponding to the extracted identification number, and ascertain information regarding a shop where a corresponding product is sold. For each shop, the shop status manager 151 may ascertain the number of detections of genuine products and the number of detections of fake products. The shop status manager 151 may generate genuine-product certification ranks for the products on a shop basis.

Figure 10:
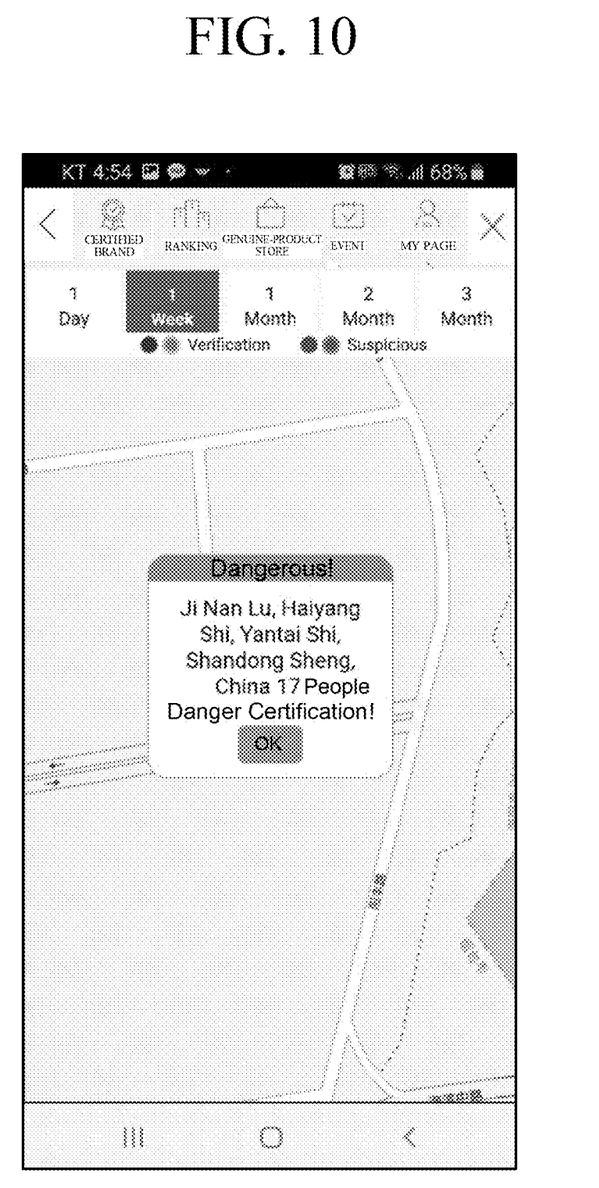
FIG. 10 is a diagram showing that a caution message about a shop is transmitted to a user terminal according to an embodiment disclosed herein.

Also, the shop status manager 151 may extract user location information from the user-related information included in the genuine-product certification request. The shop status manager 151 may ascertain a shop which corresponds to the user location information and transmit a genuine-product certification status of the corresponding shop to the user terminal 104. When the number of times fake products are detected in the corresponding shop during a preset period of time exceeds a preset number, the shop status manager 151 may transmit a caution message to the user terminal 104 as shown in FIG. 10.

Meanwhile, the genuine-product certification content creation device 102 may be implemented separately from the integrated certification management server 106, but the present disclosure is not limited thereto. The genuine-product certification content creation device 102 may be implemented in the integrated certification management server 106. In this case, some elements (e.g., a product registration element, an identification number generation element, etc.) of the genuine-product certification content creation device 102 may be performed in the distribution management module 131 or the genuine-product certification module 133.

The term "module" used herein may refer to a functional or structural combination of hardware for performing the technical spirit of the present disclosure and software for driving the hardware. For example, the module may refer to a predetermined code and a logic unit of a hardware resource for performing the code and does not necessarily refer to a physically connected code or a kind of hardware.

Figure 11:
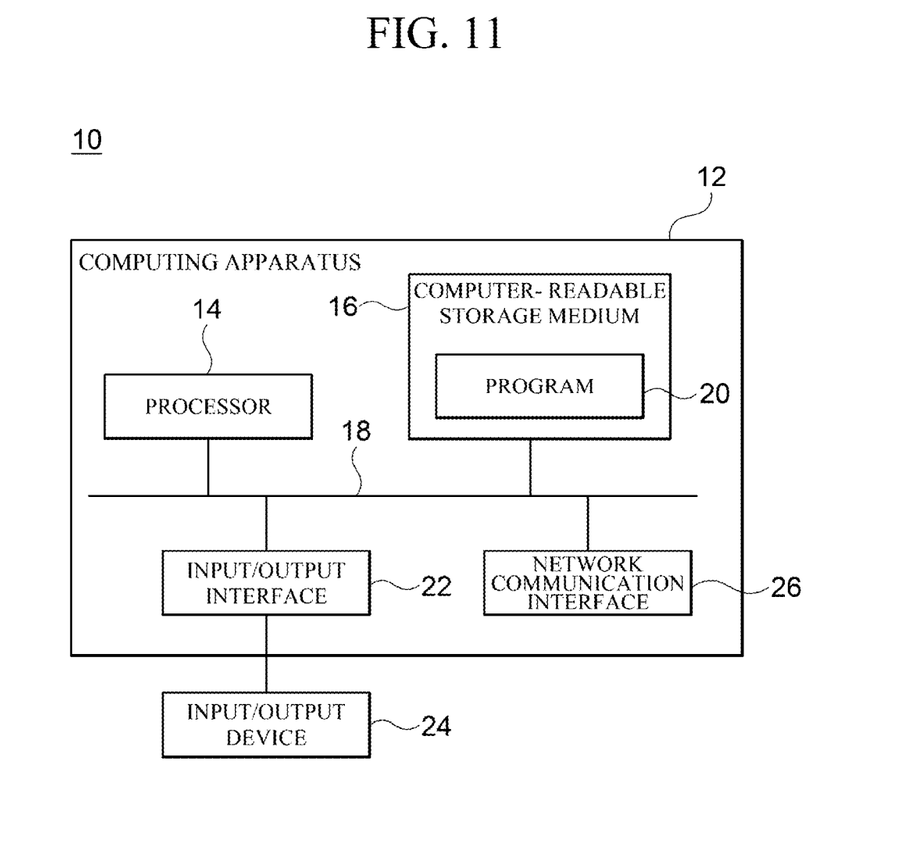
FIG. 11 is a block diagram illustrating a computing environment including a computing apparatus suitable for use in exemplary embodiments.

FIG. 11 is a block diagram illustrating a computing environment 10 including a computing apparatus suitable for use in exemplary embodiments. In the illustrated embodiment, each component may have a function and capability that differ from those described below, and an additional component may be included in addition to those in the following description.

As shown, the computing environment 10 includes a computing apparatus 12. In an embodiment, the computing apparatus 12 may be a genuine-product certification content creation device 102. Also, the computing apparatus 12 may be a user terminal 104. Also, the computing apparatus 12 may be an integrated certification management server 106.

The computing apparatus 12 includes at least one processor 14, a computer-readable storage medium 16, and a communication bus 18. The processor 14 may enable the computing apparatus 12 to operate according to the aforementioned exemplary embodiment. For example, the processor 14 may execute one or more programs stored in the computer-readable storage medium 16. The one or more programs may include one or more computer-executable instructions, which may be configured to enable the computing apparatus 12 to perform operations according to an example embodiment when the operations are executed by the processor 14.

The computer-readable storage medium 16 is configured to store computer-executable instructions, program codes, program data, and/or other suitable forms of information. A program 20 stored in the computer-readable storage medium 16 includes a set of instructions executable by the processor 14. In an embodiment, the computer-readable storage medium 16 may be a memory (a volatile memory such as a random access memory, a non-volatile memory, or an appropriate combination thereof), one or more magnetic disk storage devices, optical disk storage devices, flash memory devices, other forms of storage media that may be accessed by the computing apparatus 12 to store desired information, or a suitable combination thereof.

The communication bus 18 connects various different components of the computing apparatus 12, which includes the processor 14 and the computer-readable storage medium 16, to one another.

Also, the computing apparatus 12 may include one or more input/output interfaces 22 for providing an interface for one or more input/output devices 24, and one or more network communication interfaces 26. The input/output interfaces 22 and the network communication interfaces 26 are connected to the communication bus 18. The input/output devices 24 may be connected to other components of the computing apparatus 12 through the input/output interfaces 22. An example input/output device 24 may include input devices such as a pointing device (a mouse, a trackpad, etc), a keyboard, a touch input device (a touchpad, a touch screen, etc.), a voice or sound input device, various kinds of sensor devices, and/or a capture device and/or may include output devices such as a display device, a printer, a speaker, and/or a network card. The example input/output device 24 may be included in the computing apparatus 12 as a component of the computing apparatus 12 and may be connected to the computing apparatus 12 as a separate device distinct from the computing apparatus 12.

According to the disclosed embodiments, each user can quickly and easily ascertain whether a corresponding product is genuine by recognizing a genuine-product certification label attached to the product through an application installed in a user terminal. Also, each manufacturer can monitor, in real time, a distribution status (warehousing and shipping, product purchase status, etc.) of products allocated to each distributor through a distribution number of each distributor matched to the identification number.

Also, by statically processing and providing a genuine-product certification status on a region basis, on a user basis, on a language basis, on a product basis, and the like, consumers may ascertain a region where a large number of genuine products are detected or a region where a large number of fake products are detected, and thus it is possible to prevent mistakes due to the purchase of fake products upon a product purchase.

Although exemplary embodiments of the disclosure have been described in detail, it will be understood by those skilled in the art that various changes may be made without departing from the spirit or scope of the disclosure. Therefore, the scope of the present disclosure is to be determined by the following claims and their equivalents and is not restricted or limited by the foregoing detailed description.

What is claimed is:

1. A genuine-product certification content creation device comprising:
    a product information registrator configured to register product-related information for products to which genuine-product certification labels are to be attached;
    an identification number generator configured to generate identification numbers of the products according to the number of registered products;
    a watermark signal generator configured to generate a watermark signal to be inserted into content of each of the genuine-product certification labels on the basis of the identification numbers; and
    a watermark signal inserter configured to insert the watermark signal into the content according to a predetermined insertion intensity to generate genuine-product certification content,
    wherein the watermark signal generator is configured to convert each of the identification numbers into a spreading sequence pattern having a preset length and generate a watermark signal by randomly shuffling coefficient values in the spreading sequence pattern using a preset indexing key,
    wherein the watermark signal inserter is configured to divide the content into a plurality of blocks, calculates a local moment, which is a standard deviation, for each block of the content, applies a noise visibility function (NVF) filter to each block of the content to calculate an NVF value for a corresponding block, and determine the insertion intensity on the basis of the calculated local moment and the calculated NVF value, wherein the watermark signal inserter is configured to insert the watermark signal into each block of the content using the following equation:

$$I'_{n,m} = I_{n,m} + \text{LocalMoment}_{(n,m)} * \text{NVF}_{(n,m)} * SPSQ_{(n,m)} * PW_{(i,j)}$$

where:

$I'_{n,m}$ is content into which a watermark signal of a block having a size of n×m is inserted;

$I_{n,m}$ is original content having a block having a size of n×m;

$\text{LocalMoment}_{(n, m)}$ is a local moment value of a corresponding block;

$\text{NVF}_{(n, m)}$ is an NVF value of a corresponding block;

$SPSQ_{(n, m)}$ is a watermark value to be inserted into a corresponding block; and $PW(\text{Pixel Weight})_{(i,j)}$ is a weight of an $(i,j)^{th}$ pixel of a corresponding block and is a variation allowed for brightness of each pixel.

2. The genuine-product certification content creation device of claim 1, wherein the product information registrator generates serial numbers of the products equal in number to the identification numbers and stores the generated serial numbers mapped one-to-one to the identification numbers.

3. The genuine-product certification content creation device of claim 1, wherein the genuine-product certification content includes an edge pattern provided at each corner of the content; and the edge pattern comprises:
a center pattern provided outside a corresponding edge and spaced apart from a center of the content in a direction toward the corresponding edge;
a first edge line pattern provided along an edge of the content in a first direction from the center pattern; and
a second edge line pattern provided along an edge of the content in a second direction perpendicular to the first direction from the center pattern.

4. The genuine-product certification content creation device of claim 3, wherein the first edge line pattern comprises:
a first long pattern having a first length and spaced a preset reference distance from the center pattern; and
a first short pattern having a second length smaller than the first length and spaced a preset reference distance from the first long pattern; and the second edge line pattern comprises:
a second long pattern having the first length and spaced a preset reference distance from the center pattern; and
a second short pattern having the second length and spaced a preset reference distance from the second long pattern.

* * * * *